B. BURTON.
Breech Loading Fire Arm.
No. 3,770. Reissued Dec. 21, 1869.
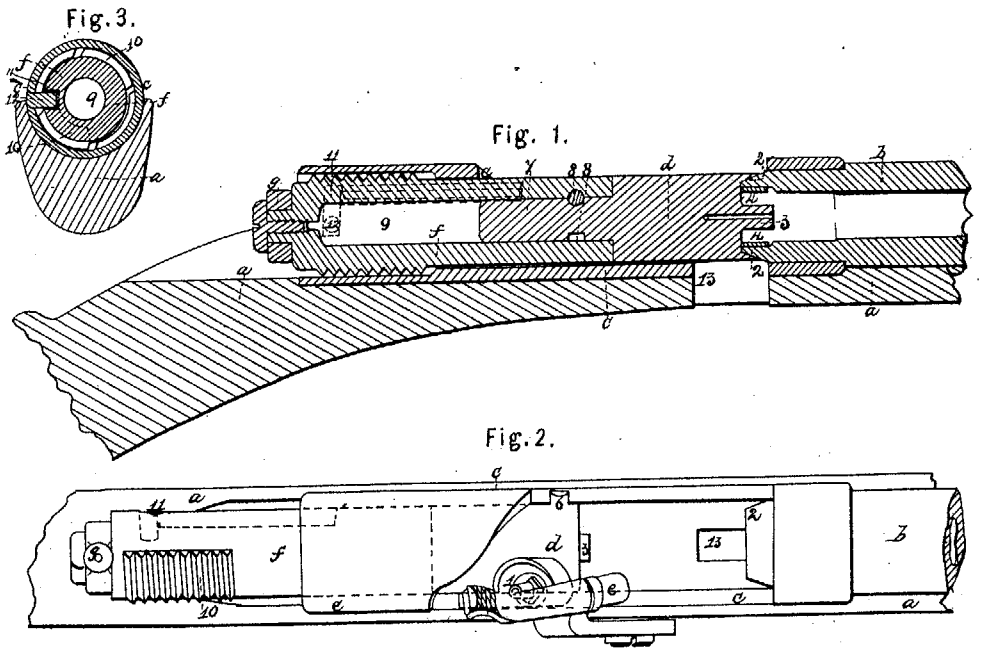
Witnesses:
Lemuel W. Serrell
Thos. Geo. Harold
Inventor:
Bethel Burton
N. PETERS, Photo-Lithographer, Washington, D. C.

UNITED STATES PATENT OFFICE.

BETHEL BURTON, OF BROOKLYN, N. Y., AND W. G. WARD, OF NEW YORK, N. Y., ASSIGNEES OF BETHEL BURTON.

IMPROVEMENT IN BREECH-LOADING FIRE-ARMS.

Specification forming part of Letters Patent No. 26,475, dated December 20, 1859; Reissue No. 3,770, dated December 21, 1869.

*To all whom it may concern:*

Be it known that BETHEL BURTON, of Brooklyn, in the county of Kings and State of New York, invented certain new and useful Improvements in Breech-Loading Fire-Arms; and we do hereby declare that the following is a full, clear, and exact description thereof, reference being had to the accompanying drawings, making part of this specification, and to the letters of reference marked thereon.

The nature of the invention consists in, first, an opening in the breech-piece and stock to allow the escape of gas and smoke, prevent heating and clogging, and keep the working parts lubricated; second, a breech-pin made in two or more pieces, with a broken joint or joints, the pieces connected together by means of screws, pins, or splines; third, one or more projections on the forward end of the breech-pin for the purpose of guiding it and holding it in place; fourth, an L-shaped groove and guiding pin or projection for guiding and holding in place the rear end of the breech-pin; fifth, a cavity or depression on the forward end of the breech-pin, and its combination, with a sliding ring in the rear end of the barrel; sixth, one or more sectional screws on the inside of the breech-piece, in combination with corresponding screw-threads on the breech-pin.

To enable those skilled in the art to which the invention appertains to make and use the same, we will proceed to describe its construction and operation.

In the drawings, Figure 1 is a longitudinal vertical section of the improved fire-arm at the breech. Fig. 2 is a plan or top view of the same. Fig. 3 is a transverse vertical section.

The barrel *b* is attached to the stock *a* in any suitable manner.

To the rear end of the barrel *b* is attached a breech-piece, *c*, the upper portion of which is cut away, so as to form an opening sufficiently large to admit a cartridge, and one side is cut down to allow of the cartridge or shell being easily removed.

In the bottom of the breech-piece *c*, near the rear end of the barrel, is an opening, which extends through the stock *a*, as shown at 13 in Figs. 1 and 2, which allows of ventilation between the breech-piece and breech-pin and prevents the parts from becoming heated. It also allows the gas and smoke to escape instead of flying back and clogging the joints. By this means the parts are kept thoroughly lubricated, as it is impossible for the gas and smoke to come in contact with the lubricating substance or destroy its efficiency.

The breech-pin is made in two or more pieces, with a broken joint or joints. The front portion, *d*, is provided with a nipple or cone, 1, against which the hammer *e* strikes in discharging the gun.

On one or both sides of the piece *d* is a lug or projection, 6. If the nipple 1 be placed on the side of the piece *d*, its base will serve instead of a second lug; but if placed on the top of the piece *d* two lugs are necessary. These lugs slide on the edges of the open part of the breech-piece, and serve to guide the piece *d* as it is moved back and forward, and prevent its rotation to either side. The front end of the piece *d* is made concave to receive the conical rear end of the barrel, as shown at 2 in Figs. 1 and 2. Projecting from the center is a plug, 3, for the purpose of forcing the cartridge into the barrel and beyond the sliding packing-ring 4, which occupies a recess at the rear end of the barrel, and which is thrown by the explosion back against the piece *d*, so as to form a tight joint. The rear end of the piece *d* is made smaller than the other portion, forming a tenon, 7, as shown in Fig. 1, which fits in the front end of the rear piece, *f*, of the breech-pin, and around which is formed a groove, 8. The piece *f* is bored out a sufficient depth to leave a chamber, 9, for oil or grease.

Near the front end of the piece *f* is a screw or pin, which engages with the groove 8, so that the piece *f* is free to turn without revolving the piece *d*; but both pieces are securely connected together. By having the piece *d* remain stationary while the piece *f* is rotated, there is no friction against the base or head of the cartridge, and consequently no danger of premature explosion.

Instead of a screw or pin, there may be a key or feather formed on the inside of the piece *f*, so as to enter a spline in the tenon 7 and engage with the groove 8. The rear part of the piece *f* has one or more sectional screws, 10, formed on it, and similar sectional screws are formed on the inside of the breech-piece *c*, so that in moving the breech-pin back and forward, the sectional screws on the breech-pin pass between those on the inside of the breech-piece, and when in place a partial rotation of the piece *f* by the lever *g* brings the screw-threads into each other and forces the breech-pin home.

On the piece *f* is formed an L-shaped groove, 11, which runs longitudinally for a portion of the distance, and then turns at a right angle, and runs transversely partially around the piece *f*.

Projecting from the inside of the breech-piece *c* is a pin or screw, 12, which engages with the groove 11, so that when the breech-pin is moving forward it cannot turn to the right or left until it reaches the proper point, whereupon the pin or screw 12 engages with the transverse portion of the slot and allows the piece *f* to turn and the screw-threads 10 to engage with each other and force the breech-pin home.

Having thus described the invention, what we claim as new, and desire to secure by Letters Patent, is—

1. The opening 13, arranged as described, in connection with the breech-piece and stock, for the purpose of allowing the escape of gas and smoke, preventing heating and clogging, and facilitating the lubrication of the parts, substantially as shown and described.

2. A breech-pin made in two or more pieces, with a broken joint or joints, when the front end has a reciprocating motion only and the rear end a reciprocating and rotary motion, substantially as shown and described.

3. One or more projections on the forward end of the breech-pin for guiding it and holding it in place, when made and operating as shown and described.

4. The L-shaped groove 11 in the breech-pin, in combination with the pin or projection 12 on the inside of the breech-piece, when arranged and operating as shown and described.

5. A concavity or depression on the front end of the reciprocating breech-pin, receiving the conical rear end of the barrel, in combination with a sliding packing-ring in the rear end of the barrel, when made as shown and described.

6. The combination of the breech-piece and the reciprocating breech-pin, made to slide therein when provided with sectional screws, as shown and described.

BETHEL BURTON.
WILLIAM G. WARD.

Witnesses to signature of Bethel Burton:
J. N. MORSE,
J. C. KENILWORTH.

Witnesses to the signature of William G. Ward:
ROBERT WILSON,
H. G. CRAIG.